May 29, 1951 H. R. MOON 2,554,917
V-BELT
Filed Oct. 1, 1945
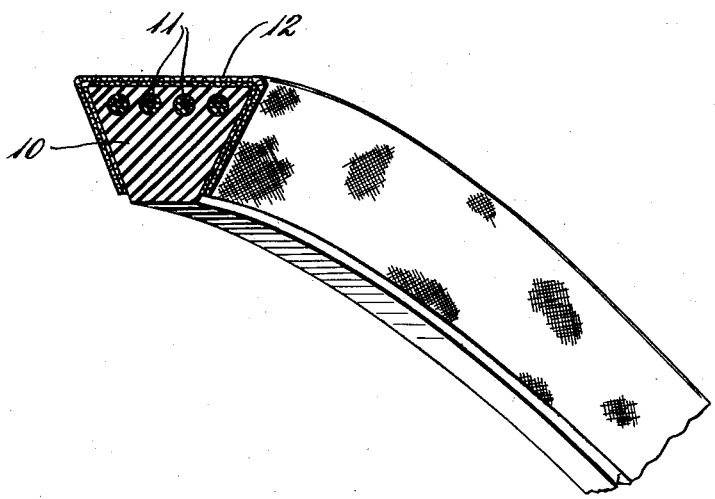
Inventor
Howard R. Moon
By
Att'y Patented May 29, 1951

2,554,917

UNITED STATES PATENT OFFICE 2,554,917

V-BELT

Howard R. Moon, Cuyahoga Falls, Ohio, assignor to The B. F. Goodrich Company, New York, N. Y., a corporation of New York Application October 1, 1945, Serial No. 619,503

1 Claim. (Cl. 74—233)

This invention relates to power transmission belts of trapezoidal cross-section commonly known as V-belts.

In the operation of V-belts it has been found that a great amount of internal friction is developed due to the thickness of the belts and the consequent successive compressing and tensioning of those parts of the belt most remote from its neutral axis due to bending about small pulleys, and this is particularly true where the parts most remote from such axis are of textile material.

Objects of the present invention are to reduce internal friction, to increase the running life of the belt, and to simplify construction.

These and other objects will appear from the following description and the accompanying drawing.

The drawing shows a perspective view of a section of a belt constructed in accordance with and embodying the invention.

Referring to the drawing, the numeral 10 designates a body of resilient rubber composition or other material having the physical properties of soft vulcanized rubber composition, hereinafter referred to as rubber-like material. This body is of trapezoidal cross section.

Located in the outer or tension zone of the belt beyond its neutral axis, which is at or near the center of the belt section and is at a plane of the belt at which neither extension nor compression of the belt takes place, is a layer of two or more tension members 11, preferably in the form of cords or cables of fibrous material or wires, and preferably arranged in spaced apart relation so that the rubber-like material of the body 10 extends between and around them to bind each tension member to the body.

For increasing resistance to wear, one or more layers 12 of bias cut fabric extend across the outer face of the belt and downwardly along the sides of the belt which contact with the V-grooves of the pulleys in use, and are bonded to the rubber-like material of the body. The cover formed of the bias-laid fabric terminates in or near the side faces and preferably in the region of the inner corners of the belt section, and preferably short of the inner face of the belt. This arrangement leaves the rubber-like material of the body exposed across the inner face of the belt which does not contact with the pulley and generally reduces the amount of textile reinforcement in the compression zone of the belt thereby reducing internal friction and heat resulting therefrom.

Variations may be made without departing from the scope of the invention as it is defined by the following claim.

I claim:

A transmission belt of trapezoidal cross-section having inner and outer parallel faces and side-driving faces inclined thereto and diverging outwardly of the belt, said belt comprising a body of trapezoidal cross-section having an outer tension zone of tension members embedded in rubber-like material and an inner compression zone of resilient rubber-like material, and a cover of wear-resisting flexible bias-cut fabric extending continuously about the outer face and over the side-driving faces of said body with its edges terminating at the driving faces short of the inner face in the region of the inner corners of the belt section and bonded to the resilient rubber-like material leaving the rubber-like material of said body exposed across the inner face of the belt.

HOWARD R. MOON.

REFERENCES CITED

The following references are of record in the file of this patent:

UNITED STATES PATENTS

| Number | Name | Date |
|---|---|---|
| 1,911,496 | Freedlander | May 30, 1933 |
| 2,029,381 | Merrill et al. | Feb. 4, 1936 |
| 2,163,347 | Nassimbene | June 20, 1939 |
| 2,176,335 | Gray | Oct. 17, 1939 |
| 2,392,373 | Freedlander | Jan. 8, 1946 |
| 2,414,822 | Lindsay et al. | Jan. 28, 1947 |
| 2,442,037 | Carter et al. | May 25, 1948 |